United States Patent [19]

Ernest

[11] 4,277,907

[45] Jul. 14, 1981

[54] SLUG TRAP

[76] Inventor: Lorraine D. Ernest, 945 S. 2nd, Coos Bay, Oreg. 97420

[21] Appl. No.: 137,136

[22] Filed: Apr. 4, 1980

[51] Int. Cl.³ .................................................. A01M 1/20
[52] U.S. Cl. ...................................................... 43/131
[58] Field of Search ............................................ 43/131

[56] References Cited

U.S. PATENT DOCUMENTS

| | | | |
|---|---|---|---|
| 1,443,287 | 1/1923 | Snyder et al. | 43/131 |
| 1,517,502 | 12/1924 | Grissom et al. | 43/131 |
| 1,573,278 | 2/1926 | Schlesinger | 43/131 |
| 1,579,111 | 3/1926 | Hinkson | 43/131 |
| 1,729,389 | 9/1929 | Hughett | 43/131 |
| 1,769,408 | 7/1930 | Andrews | 43/131 |
| 1,815,595 | 7/1931 | Simpson | 43/131 |
| 1,922,702 | 8/1933 | Kristman | 43/131 |
| 2,060,245 | 11/1936 | Rosefield | 43/131 |
| 2,750,707 | 6/1956 | Ekstedt | 43/131 |
| 4,194,690 | 3/1980 | Stever et al. | 43/131 |

FOREIGN PATENT DOCUMENTS

| | | | |
|---|---|---|---|
| 1463757 | 11/1966 | France | 43/131 |
| 1448214 | 9/1976 | United Kingdom | 43/131 |

Primary Examiner—Jimmy C. Peters
Assistant Examiner—J. T. Zatarga
Attorney, Agent, or Firm—Kolisch, Hartwell & Dickinson

[57] ABSTRACT

A slug trap which includes a cylindrical side wall and a top and bottom closing off a hollow interior in the trap. A slug entering aperture is formed in the bottom of the trap which is bounded by an upstanding wall projecting upwardly into the interior of the trap.

5 Claims, 3 Drawing Figures

SLUG TRAP

BACKGROUND AND SUMMARY OF THE INVENTION

This invention concerns a trap, and more particularly a slug trap adapted to hold bait which kills slugs on the bait being consumed.

There are a variety of poisoness slug baits on the market which are enticing to slugs and cause death on being consumed. Unfortunately, however, such baits are attractive to birds, small animals, and even dogs, and will produce sickness or death in such animals if consumed in any quantity. As a consequence, persons who are concerned with the environment and the safety of animal life are reluctant to use such baits.

An additional problem accompanying the use of such baits is that most tend to disintegrate rather rapidly under repeated soaking with water. As a result, in areas of the country where rain is prevalent, or in garden areas that are frequently watered or irrigated, slug bait used retains its effectiveness only for a limited period of time.

A need, therefore, arises for a slug trap device constructed in such a fashion as to hold a quantity of bait with such out of the reach of birds and small animals, and with such effectively shielded from the rain, the bait nevertheless being easily reachable by slugs and offering an enticing lure to slugs.

Generally, therefore, an object of the invention is to provide a slug trap which meets the foregoing requirements in a highly practical and satisfactory manner.

More specifically, an object of the invention is the provision of a slug trap which features a hollow body for holding the slug bait and an entrance to such body whereby slugs may have access to the bait projecting upwardly from the underside of the body and defined by a tunnel-forming wall that communicates with the body interior.

A further object is to provide a slug trap including a hollow body for holding the slug bait where the trap is adapted to be supported on the ground with the body thereof slightly above ground level. This construction, and an entrance to the trap through the bottom of the trap, provides easy access for slugs to the trap while preventing birds and animals from having access to the bait. Slugs are enticed to the bait by the smell of the bait and also by the fact that the underside of the body is shaded from the sun and offers an enticing environment for the slugs.

These and other objects and advantages are attained by the invention, which is described herein below in conjunction with the accompanying drawings, wherein:

A BRIEF DESCRIPTION OF THE DRAWINGS

DETAILED DESCRIPTION OF THE INVENTION

Figure 2:
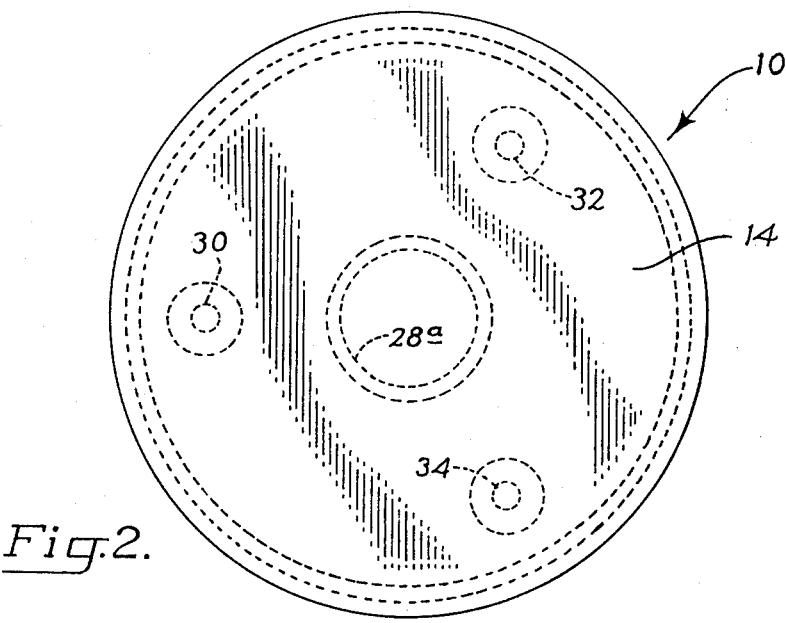
FIG. 2 is a plan view of the trap illustrating FIG. 1.
Figure 1:
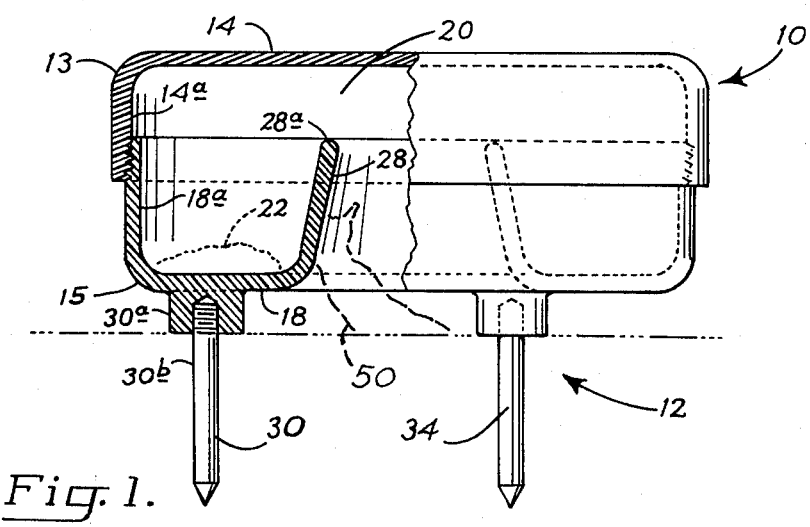
FIG. 1 is a side view of a trap according to one embodiment of the invention, showing the trap planted on the ground, and with portions broken away to illustrate interior details.

Referring now to the drawing, and more particularly to FIGS. 1 and 2, the trap therein illustrated comprises a hollow container body generally indicated at 10. The trap is planted on the ground through a support means generally indicated at 12.

Hollow body 10 is formed by a top shell 13 and a bottom shell 15. Top shell 13 includes top 14 and a depending skirt 14a forming part of a cylindrical side wall in the body. Bottom shell 15 includes bottom 18 and upwardly projecting skirt 18a forming the remainder of the cylindrical side wall in the body. Within body 10 is a chamber or enclosure 20.

During use of the trap, slug bait such as is shown at 22 is deposited within the enclosure 20. To provide access to the interior of body 10 it is contemplated that the top be separable to expose chamber 20. Thus, as shown in FIG. 1 depending skirt 14a is internally threaded at 23. Receiving these threads are external threads 24 on skirt 18a. By twisting the top shell in a conventional manner, the shell may be removed for the insertion of bait, and then returned.

Formed in the base or bottom of the body is a slug entering aperture or hole shown at 26. Bounding this aperture is an upstanding continuous tunnel-forming wall 28. This wall extends upwardly into the interior of the body and terminates at an elevation below top 14. The top edge 28a of this tunnel-forming wall bounds a void, and this void forms an opening which communicates with the interior of body 10.

The top and sides of body 10 are imperforate. Thus, with bait deposited within the trap, such bait is shielded from the rain and other falling water. It is contemplated that the trap be made of metal, or plastic of an opaque nature, whereby the underside of the trap be shaded from the sun.

Support means 12 takes the form of three pegs shown at 30, 32 and 34 which project downwardly from bottom 18. Each peg is made up of a socket portion, internally threaded, as exemplified by socket portion 30a, and a pointed shank 30b externally threaded at the top which is screwed into socket portion 30a.

The three pegs provide a means for firmly planting the trap in the ground whereby it is prevented from being knocked over by an animal. The socket portions constitute radial enlargements in the pegs spaced upwardly from the lower ends of the pegs, and the bottom expanses of the socket portions occupy a plane spaced somewhat below the plane of bottom 18. When the trap is planted into the ground these bottom expanses serves as a means limiting penetration of the pegs to insure that the bottom of the trap with the trap planted is spaced somewhat above ground level.

When using the trap, slug bait is distributed within the interior of the trap and the trap is planted in place as shown in FIG. 1. A slug such as the slug shown at 50, enticed by the smell of the bait and also encouraged by the shaded environment provided under the trap, moves under the trap and enters the trap through aperture 26 and the tunnel formed by wall 28. While the bait is accessible to slugs it is shielded from animals and birds who cannot move under the trap.

Figure 3:
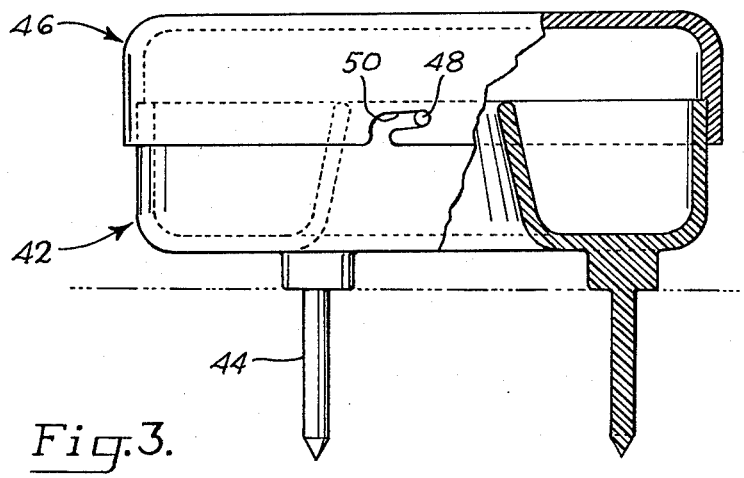
FIG. 3 is a side view of portions of a trap according to another modification of the invention.

In FIG. 3, a modified form of the invention is illustrated. In the trap shown in this figure, which may be made of molded plastic and the like, bottom shell 42 includes pegs 44 which are integral with the bottom of the bottom shell. Again, preferably the pegs have radial enlargements disposed upwardly of their lower ends which tend to limit penetration of the pegs and define a seated position for the trap.

In the modification of the invention shown in FIG. 3, top shell 46 has a lower margin which overlaps the upper margin of the bottom shell. Securing the two shells together are detents such as detent 48 which are secured to the base shell, and hooked slots such as slot 50 which receive these detents and serve to lock the cover shell in place when such is lowered and turned on the detents.

The trap of the invention is durable. Its construction is relatively simple, and the trap is producable at relatively low cost.

While various modifications of the invention have been shown and described herein, it should be obvious that variations are possible without departing from the invention.

It is claimed and desired to secure by Letters Patent:

1. A slug trap comprising:
    a hollow container body formed of a bottom shell having a bottom and an upwardly projecting skirt and a top shell detachably secured to the bottom shell including a top and a downwardly projecting skirt overlying the exterior of the skirt in the bottom shell;
    a slug entering aperture formed in the bottom of said bottom shell and an upstanding wall bounding said aperture projecting upwardly into the interior of said body to approximately the level of the top of said skirt in the bottom shell where the wall bounds a void communicating with the body interior, said bottom shell in a region bounded by said bottom, upwardly projecting skirt, and said wall providing an annular region for the deposit of bait with the top shell removed so as to provide access to said region, and
    means joined to the body for supporting said body with the bottom thereof spaced above ground level, said means comprising elongate pegs distributed about said aperture and joined to and projecting downwardly from said bottom shell.

2. The slug trap of claim 1, wherein said pegs upwardly from their lower ends have radial enlargements with bottom surfaces defining a plane spaced below said bottom and serving to define limits of penetration for said pegs.

3. A slug trap comprising:
    a hollow body formed of a bottom shell having a bottom and an upwardly projecting skirt and a top shell detachably secured to the bottom shell including a top and a downwardly projecting skirt overlying the exterior of the skirt in the bottom shell,
    said shells being imperforate save for an aperture located substantially centrally of said bottom, said bottom, side wall and top defining a hollow chamber within said body,
    an upstanding continuous tunnel forming wall bounding said aperture and extending upwardly into the interior of said body which terminates adjacent the level of the top of the skirt in the bottom shell to define an opening communicating with the interior of said body, said bottom shell in a region bounded by said bottom, upwardly projecting skirt and said tunnel forming wall providing an annular region for the deposit of bait with the top shell removed to provide access to said region, and
    means for supporting said body above the ground, said means comprising pegs distributed about said aperture and joined to said body extending downwardly from said body for a distance which is at least equal to the height of the skirt in the bottom shell.

4. The slug trap of claim 3, which further includes threaded means interposed between the upwardly projecting skirt of the bottom shell and the downwardly projecting skirt in the top shell detachably securing the shells together.

5. The slug trap of claim 4, wherein said pegs upwardly from their bottom ends have radial enlargements serving to define limits of penetration for said pegs into the ground.

* * * * *